United States Patent [19]
El-Ibiary

[11] Patent Number: 5,909,170
[45] Date of Patent: Jun. 1, 1999

[54] SPEED REDUCER WITH PRESSURE SENSOR

[75] Inventor: Yehia M. El-Ibiary, Simpsonville, S.C.

[73] Assignee: Reliance Electric Industrial Company, Cleveland, Ohio

[21] Appl. No.: 08/730,647

[22] Filed: Oct. 11, 1996

[51] Int. Cl.[6] .................................................. B60Q 1/00
[52] U.S. Cl. ......................... 340/451; 340/438; 340/626
[58] Field of Search .................................... 340/451, 452,
340/679, 626, 438; 74/606 A, 606 R; 184/6.12,
104.1

[56] References Cited

U.S. PATENT DOCUMENTS

| | | | |
|---|---|---|---|
| 3,090,848 | 5/1963 | Scholz | 340/451 |
| 3,518,962 | 7/1970 | De Leu | 116/118 |
| 3,541,416 | 11/1970 | Woyton | 318/331 |
| 3,715,932 | 2/1973 | Sharp | 74/42 |
| 3,736,812 | 6/1973 | Wellauer | 4/606 A |
| 3,916,326 | 10/1975 | Woyton | 328/118 |
| 4,095,644 | 6/1978 | Huff | 165/13 |
| 4,333,095 | 6/1982 | Silva | 340/679 |
| 4,770,065 | 9/1988 | Woyton | 74/866 |
| 5,413,462 | 5/1995 | Alberni | 415/169.1 |
| 5,433,525 | 7/1995 | El Ibiary | 384/448 |
| 5,439,296 | 8/1995 | El Ibiary | 384/448 |
| 5,509,310 | 4/1996 | El Ibiary | 73/660 |
| 5,531,245 | 7/1996 | Sparks | 137/341 |
| 5,563,585 | 10/1996 | MacDonald | 340/626 |

*Primary Examiner*—Jeffery A. Hofsass
*Assistant Examiner*—Julie Lieu
*Attorney, Agent, or Firm*—Lloyd G. Farr; John M. Miller; John J. Horn

[57] ABSTRACT

An improved speed reducer assembly is provided. The assembly comprises an input shaft, an output shaft and a gear train interfacing the input shaft and the output shaft to effect a desired angular velocity ratio between the input shaft and the output shaft. A housing defines an interior area in which the gear train is disposed, the housing being configured to hold lubricant within the interior area. A pressure sensing device is mounted on the housing in communication with the interior area. The pressure sensing device is configured to output a pressure signal responsively to fluid pressure within the interior area. A second housing may be provided to sealingly enclose a portion of the pressure sensing device outside the speed reducer housing.

23 Claims, 3 Drawing Sheets

SPEED REDUCER WITH PRESSURE SENSOR

BACKGROUND OF THE INVENTION

The present invention relates to speed reducers of the type frequently used in mechanical systems. More particularly, the invention relates to speed reducers having a pressure sensing device mounted thereon.

The use of speed reducers is well known in industry for translating rotational speed and torque from an input shaft to a desired rotational speed and torque at an output shaft that is connected, for example, to an industrial machine. Speed reducers typically include gear trains interfacing the input shaft with the output shaft so that an appropriate input/output ratio is achieved. Generally, the gear train is enclosed by a housing which holds lubricant for lubricating the gear train during use. Typically, the lubricant does not entirely fill the housing, the remainder of the housing interior being filled with air.

The lubricant in the housing is maintained in the housing interior by seals. During operation of the speed reducer, however, heat may be generated which could cause air and lubricant in the housing interior to expand, thus increasing the pressure on the seals. To maintain the housing interior pressure at or near the ambient exterior pressure, speed reducers typically include breathers or bellows to release or equalize interior pressure. If such a pressure equalizing mechanism becomes contaminated so that it ceases to function effectively, pressure may undesirably build in the speed reducer, possibly causing the housing seals to fail, thus leading to speed reducer failure.

SUMMARY OF THE INVENTION

The present invention recognizes and addresses the foregoing disadvantages, and others, of prior art constructions and methods.

Accordingly, it is an object of the present invention to provide an improved speed reducer assembly.

More particularly, it is an object of the present invention to provide a speed reducer having a pressure sensing device for detecting pressure within the speed reducer housing.

It is also an object of the present invention to provide a mechanism to issue a warning when pressure within a speed reducer housing reaches a predetermined level so that corrective action may be taken before failure of speed reducer seals.

Some of these objects are achieved by a speed reducer assembly comprising an input shaft, an output shaft, and a gear train interfacing the input shaft and the output shaft to effect a desirable angular velocity and torque ratio between the input shaft and the output shaft. The assembly includes a housing defining an interior area in which the gear train is disposed. The housing is configured to hold lubricant within the interior area. The assembly includes a pressure sensing device mounted on the housing in communication with the interior area. The pressure sensing device is configured to output a pressure signal responsively to air or lubricant pressure within the interior area.

Some of these objects are also achieved by a speed reducer assembly comprising an input shaft, an output shaft and a gear train interfacing the input shaft and the output shaft to effect a desired angular velocity and torque ratio between the input shaft and the output shaft. The assembly includes a first housing defining an interior area in which the gear train is disposed. The first housing is configured to hold lubricant within the interior area. The assembly includes a pressure sensing device mounted on the first housing in communication with the interior area. The assembly includes an extension portion extending through the first housing to communicate with the interior area and a body portion attached to the extension portion outside the first housing from the interior area. The pressure sensing device is configured to output a pressure signal responsively to air or lubricant pressure within the interior area. The speed reducer assembly also includes a second housing sealingly enclosing at least a portion of the body portion of the pressure sensing device.

In a preferred embodiment, the pressure sensing device comprises a pressure switch extending through the speed reducer housing. The pressure switch threadedly engages the speed reducer housing wall to form a mechanical seal. The pressure switch outputs a pressure signal to a warning mechanism and is configured to change state, to go from off to on or vise versa, when it detects pressure in the speed reducer housing interior at or above a predetermined level with respect to the ambient pressure outside the speed reducer housing. Upon detection of a change of state of the pressure switch, the warning mechanism initiates corrective action.

For example, the speed reducer seals, which maintain lubricant within the speed reducer housing, may be rated for a certain maximum pressure, for example 10 psi. If the pressure switch is configured to change state at 5 psi, the warning mechanism will initiate corrective action when the pressure in the speed reducer reaches or exceeds 5 psi with respect to ambient pressure, thereby allowing correction of the problem before the speed reducer seals fail. The warning mechanism may comprise various suitable devices, for example including an audible alarm and/or a signal light which are activated to notify an operator to take corrective action. In other preferred embodiments, the waning mechanism may include a programmable logic controller (PLC), a personal computer, or other computer device which receives the pressure signal, an electrical signal, from the pressure switch and notifies an operator to take, or automatically initiates, corrective action. Corrective action may include cleaning or replacement of a speed reducer breather or bellows, turning off or disconnecting an input shaft drive motor, and/or turning off or disconnecting an output shaft load.

It should be understood by those of ordinary skill in this art that various suitable pressure sensing devices may be employed. For example, while a binary pressure switch is illustrated herein, it should be understood that other forms of sensing devices, for example which may output an analog response, may be employed. Using an analog device, pressure within the housing may be monitored continuously or periodically for data gathering or maintenance purposes.

When a pressure switch used in one preferred embodiment threadedly extends through the speed reducer housing, a body portion of the pressure switch remains outside the housing. When the speed reducer is used in a harsh environment, falling debris may damage, and dust or water may contaminate, the pressure switch. In particular, the electrical leads coming from the switch should be housed in a dust tight and liquid tight enclosure. Accordingly, in a preferred embodiment, a second housing is provided to sealingly enclose at least a part of the pressure switch body portion.

In one such embodiment, the second housing includes a box-like structure mounted onto a bracket which is in turn mounted on the speed reducer housing. The bracket serves as a floor to the second housing, and a hole is provided for passage of the pressure switch.

In construction, the bracket forming the floor of the second housing is placed over the speed reducer housing so that the hole through the bracket is aligned with the threaded hole in the speed reducer housing. A seal member is placed on the bracket surrounding the bracket hole.

The pressure switch includes a threaded extension section and a body section. The threaded section is extended through the bracket hole into the threaded hole in the speed reducer housing and tightened therein to secure the pressure switch in position with respect to the speed reducer. The body section is wider than the diameter of the bracket hole. Thus, the bracket is trapped between the body section and the speed reducer housing.

The bracket may be bolted to the speed reducer housing to secure it in at least one direction. The bracket is, however, permitted to move between the speed reducer housing and the body section of the pressure switch. The box portion of the second housing is then secured to the bracket. Jack screws threadedly extend through the second housing so that rotation of the screws in either rotational direction causes movement of the screws with respect to the bracket. If the screws are rotated so that they abut the speed reducer housing, further rotation pushes the bracket into sealing engagement with the body portion of the pressure switch at the seal member surrounding the bracket hole. In this manner, the body portion is protected from exterior debris and contaminants.

The accompanying drawings, which are incorporated in and constitute a part of this specification, illustrate a preferred embodiment of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
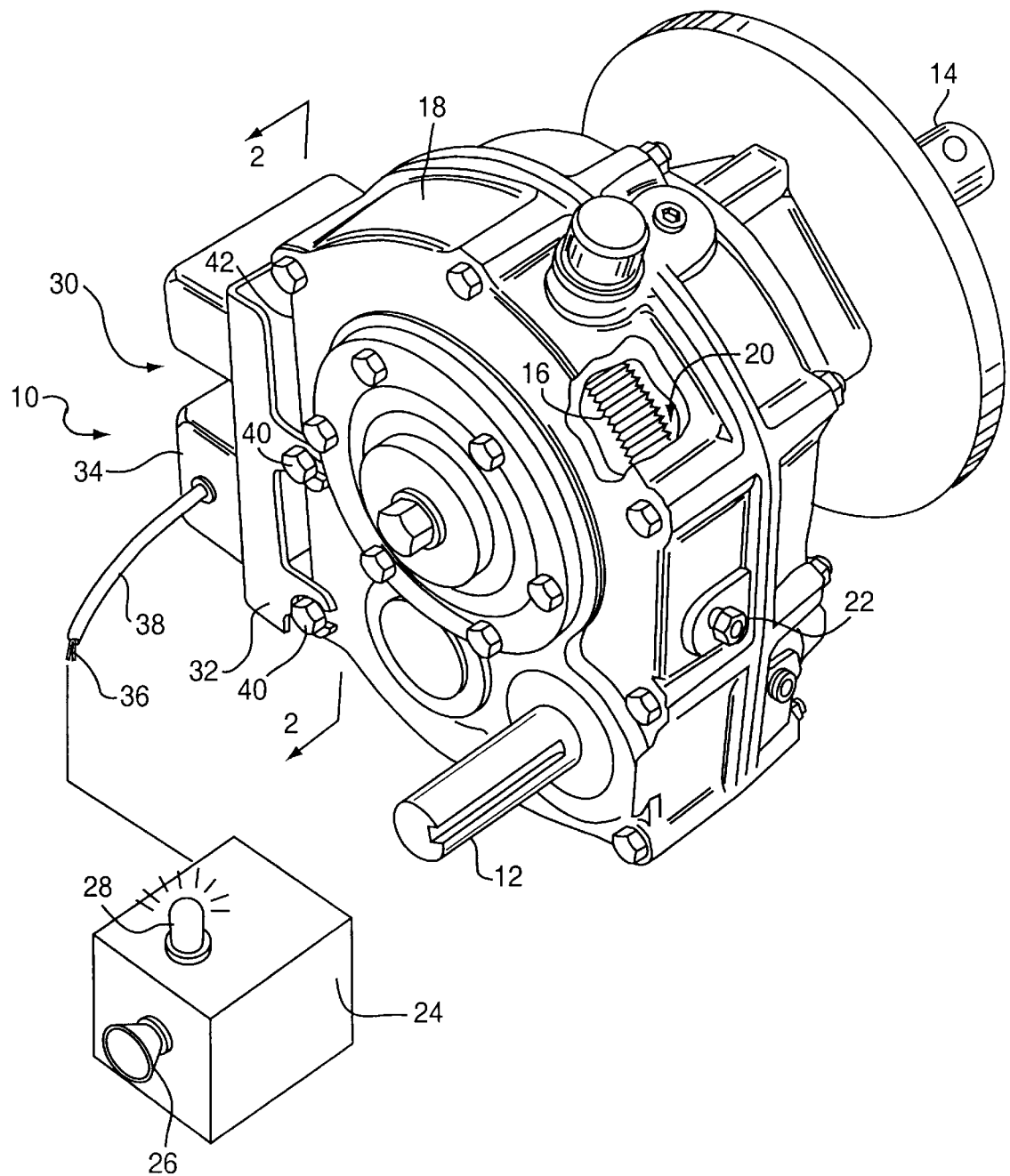
FIG. 1 is a perspective view of a speed reducer assembly constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modification and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved speed reducer assembly. Accordingly, FIG. 1 depicts a presently preferred embodiment of a speed reducer assembly, indicated generally at 10. Speed reducer assembly 10 includes an input shaft 12 and an output shaft 14. A gear train, indicated at 16, interfaces the input and output shafts to effect a desired angular velocity and torque ratio between the two, as should be understood by those of ordinary skill in the art. The operation and construction of speed reducer gear mechanisms is well known, and a detailed discussion thereof is therefore unnecessary.

Speed reducer 10 includes a speed reducer housing 18 defining an interior area 20 in which gear train 16 is disposed. Lubricant for the gears is provided in interior area 20 and is maintained in the housing by seals disposed at the junction of sections of housing 18 and at the openings in the housing for shafts 12 and 14.

The speed reducer seals are typically rated for a maximum differential pressure, for example 10 psi. That is, the seals are likely to fail if the pressure within housing 18 exceeds the ambient pressure outside housing 18 by 10 psi or more. Because pressure within housing 18 may rise, for example due to heat generated during operation of the speed reducer, an air breather 22 is provided to release air from interior area 20 as heat is generated and to permit air to enter interior area 20 as the air in the area cools. It should be understood that various suitable pressure relieving mechanisms may be employed, for example bellows or breathers provided with filters.

Because speed reducers are often used in industrial settings where dust and other debris is prevalent, breather 22 may sometimes become clogged. In such an instance, excessive pressure may not be adequately relieved from interior area 20. If the differential pressure rises to a level causing failure of the speed reducer seals, lubricant may escape interior area 20, causing failure or destruction of the speed reducer.

To permit corrective reaction before the pressure in the interior area 20 reaches a critical level, a pressure sensing device (described below) is mounted on speed reducer housing 18. In the preferred embodiments illustrated in the figures, the pressure sensing device is a pressure switch that senses air pressure in interior area 20 and outputs a pressure signal to warning mechanism 24. The pressure switch outputs a binary signal, existing in one state when the pressure of interior area 20 is below a certain predetermined level and in another state when the pressure exceeds the predetermined level. One such pressure switch is manufactured by the Hobbs Corporation of Springfield, Ill. Such pressure switches may be manufactured to operate about a predetermined differential pressure. Preferably, switches are used which operate about a differential pressure far enough below the rated pressure for the speed reducer seals, for example 5 psi for seals rated at 10 psi, so that a pressure signal may be output to warning mechanism 24 in time for corrective action to be made.

As discussed above, all suitable pressure sensing device constructions are encompassed by the present invention. As noted, the pressure signal may be a binary signal which operates about a predetermined pressure level. Alternatively, the pressure sensing device may output an analog or digital signal which varies with the internal pressure or the differential pressure so that a pressure measurement can be made at any given moment. The nature of the signal will be determined by the construction and configuration of the pressure sensing device.

Warning mechanism 24 may include various suitable devices for indicating the existence of high pressure in the speed reducer in order to initiate corrective action. For example, the mechanism may include an audible alarm 26 and/or a signal light 28 to alert an operator to take corrective action. It could also include, for example, a programmable logic controller or a personal computer to effect corrective action automatically, for example by automatically shutting down a motor attached to input shaft 12 and/or a machine attached to output shaft 14.

Because speed reducers are often used in harsh environments, a second housing 30 is mounted to speed reducer 18 about the pressure sensing device. Second housing 30 includes bracket portion 32 and cap portion 34. Wires 36 carrying the pressure signal from the pressure sensing device to warning mechanism 24 are protected by conduit 38 extending from cap 34 to warning mechanism 24.

Bracket 32 is partially secured to housing 18 by bolts 40. Bolts 40 laterally secure bracket 32 but permit movement of the bracket toward and away from face 42 of housing 18.

Figure 4:
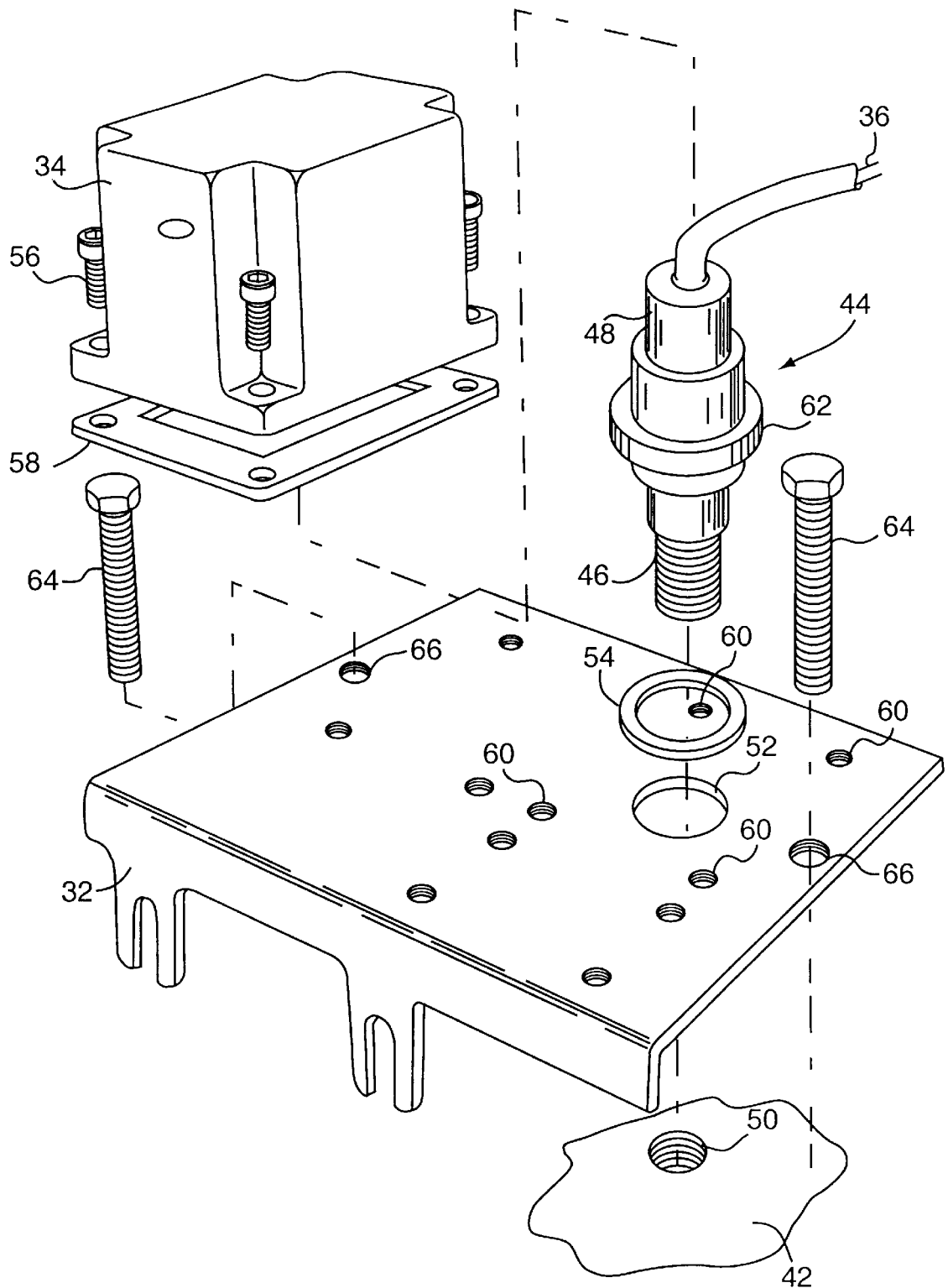
FIG. 4 is an exploded view of a pressure sensing device and housing for use in a speed reducer assembly constructed in accordance with the present invention.

Assembly of the pressure sensing device and housing 30 is illustrated in FIG. 4. Pressure switch 44 includes an extension section 46 and a body section 48. Extension section 46 includes threads to mate with cooperating threads of hole 50 in face 42. Pipe sealant may be provided in the threads of hole 50 and/or extension section 46 to improve the mechanical seal established when pressure switch 44 is threaded into hole 50.

As shown in FIG. 4, pressure switch 44 extends through a washer 54 and hole 52 in bracket 32 to threadedly engage face 42 of housing 18 (FIG. 1) at hole 50. When screwed into hole 50, pressure switch 44 is fixed to housing 18 (FIG. 1). That is, although the switch may be unscrewed and removed from the housing, the switch is secured to the housing when tightened into hole 50. Cap 34 is mounted onto the bracket 32 over pressure switch 44 by screws 56 extending through cap 34 and seal 58 into holes 60. A hole (not shown) is provided in the rear of cap 34 for passage of wires 36 into conduit 38 (FIG. 1).

As discussed above, bracket 32 is secured to housing 18 (FIG. 1) so that the bracket may move toward or away from face 42. Thus, a biasing mechanism is provided to pull bracket 32 away from face 42 into sealing engagement with pressure switch 44. Specifically, the diameter of hole 52 is narrower than the outer diameter of ledge 62 of body portion 48 of pressure switch 44. Thus, pushing or pulling bracket 32 away from face 42 to ledge 62 presses washer 54 between the upper face of bracket 32 and the lower face of ledge 62, thereby sealingly engaging bracket 32 to pressure switch 44.

In the embodiment illustrated in the figures, bracket 32 is biased towards ledge 62 by jack screws 64. Screws 64 threadedly extend through holes 66 of bracket 32 such that rotation of screws 64 and either rotational direction move screws 64 with respect to bracket 32. Screws 64 extend through hole 66 to abut face 42 such that rotation of the screws in the proper direction forces bracket 32 into sealing engagement with ledge 62 at washer 54 as described above.

Figure 2:
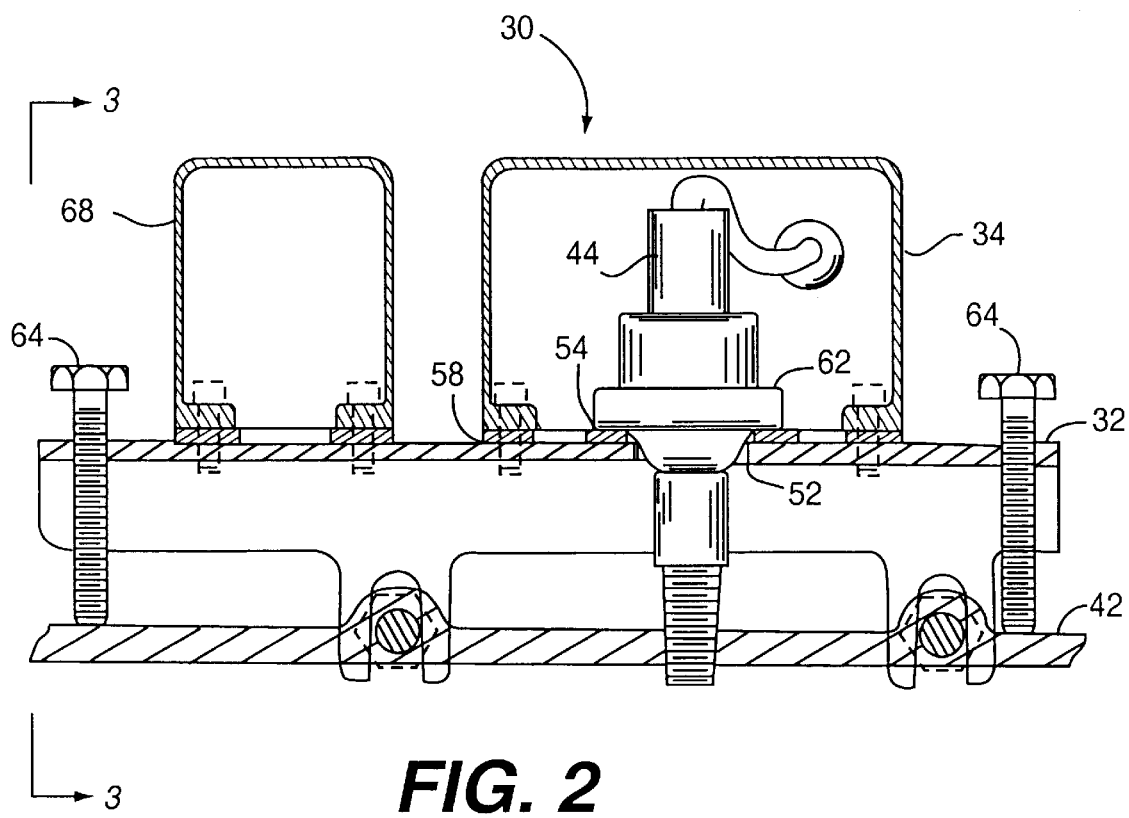
FIG. 2 is a partial cross-sectional side view of the speed reducer assembly of FIG. 1 taken along the lines 2—2.
Figure 3:
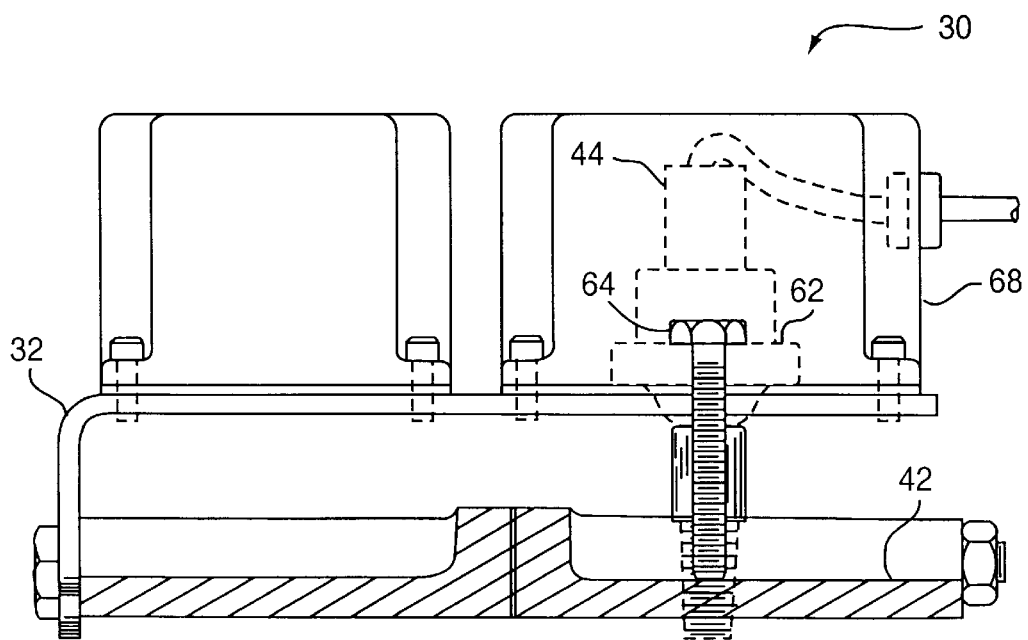
FIG. 3 is a partial cross-sectional side view of the speed reducer assembly illustrated in FIG. 1 taken along the lines 3—3 as indicated in FIG. 2.

Side views of the assembled housing 30 in sealing engagement with pressure switch 44 are illustrated in FIGS. 2 and 3. Screws 64 abut face 42 of the speed reducer housing and are tightened to force bracket 32 into sealing engagement with ledge 62 of pressure switch 44 at washer 54. This prevents the entrance of contaminants into the inner area of housing 30 through hole 52.

It should be understood that various bracket constructions may be employed. For example, additional caps 68 may be mounted on bracket 32 to house additional components.

While preferred embodiments of the invention have been described above, it is to be understood that any and all equivalent realizations of the present invention are included within the scope and spirit thereof. For example, washer 54 may be replaced with an O-ring or other suitable sealing mechanisms. Thus, the embodiments depicted are presented by way of example only and are not intended as limitations upon the present invention. Thus, it should be understood by those of ordinary skill in this art that the present invention is not limited to the depicted embodiments since many modifications can be made. Therefore, it is contemplated that any and all such embodiments are included in the present invention as may fall within the literal or equivalent scope of the appended claims.

What is claimed is:

1. A speed reducer assembly, said assembly comprising:
an input shaft;
an output shaft;
a gear train interfacing said input shaft and said output shaft to effect a desired angular velocity ratio between said input shaft and said output shaft;
a housing defining an interior area in which said gear train is disposed, said housing being configured to hold lubricant within said interior area;
an air exchange device in operative communication with said interior area and an area exterior of said housing to exchange air therebetween responsively to fluid pressure within said interior area; and
a pressure sensing device having a body sealingly engaging said housing in communication with said interior area, said pressure sensing device configured to output a pressure signal responsively to fluid pressure within said interior area.

2. The assembly as in claim 1, wherein said pressure sensing device is configured to detect a predetermined pressure within said interior area and to output said pressure signal when said pressure sensing device detects said predetermined pressure in said interior area.

3. The assembly as in claim 2, including a warning mechanism in operative communication with said pressure sensing device, said warning mechanism configured to receive said pressure signal from said pressure sensing device and to output a corrective signal to initiate corrective action in response to the detected pressure in said interior area.

4. The assembly as in claim 3, wherein said warning mechanism includes an audible alarm.

5. The assembly as in claim 3, wherein said warning mechanism includes a light signal.

6. The assembly as in claim 3, wherein said warning mechanism includes a processor device.

7. The assembly as in claim 6, wherein said processor device comprises a programmable logic controller.

8. The assembly as in claim 1, wherein said body includes an extension portion extending through said housing and a body portion attached to said extension portion outside said housing from said interior area.

9. The assembly as in claim 8, wherein said extension portion and said housing are in threaded communication with each other to form a mechanical seal therebetween.

10. The assembly as in claim 1, wherein said pressure sensing device comprises a pressure switch.

11. The assembly as in claim 1, wherein said air exchange device is an air breather.

12. A speed reducer assembly, said assembly comprising:
an input shaft;
an output shaft;
a gear train interfacing said input shaft and said output shaft to effect a desired angular velocity ratio between said input shaft and said output shaft;
a first housing defining an interior area in which said gear train is disposed, said first housing being configured to hold lubricant within said interior area;
an air exchange device in operative communication with said interior area and an area exterior of said first housing to exchange air therebetween responsively to fluid pressure within said interior area;
a pressure sensing device mounted on said first housing in communication with said interior area and including an extension portion sealingly fixed to and extending through said first housing to communicate with said interior area and a body portion attached to said extension portion outside said first housing from said interior area, said pressure sensing device being configured to output a pressure signal responsively to fluid pressure within said interior area; and
a second housing sealingly enclosing at least part of said body portion of said pressure sensing device.

13. The assembly as in claim 12, wherein said pressure sensing device is configured to output said pressure signal from said body portion.

14. The assembly as in claim 13, wherein said extension portion and said first housing are in threaded communication with each other to form a mechanical seal therebetween.

15. The assembly as in claim 12, wherein said second housing includes an opening through which said extension portion of said pressure sensing device extends.

16. The assembly as in claim 12, wherein said air exchange device is an air breather.

17. A speed reducer assembly, said assembly comprising:
an input shaft;
an output shaft;
a gear train interfacing said input shaft and said output shaft to effect a desired angular velocity ratio between said input shaft and said output shaft;
a first housing defining an interior area in which said gear train is disposed, said first housing being configured to hold lubricant within said interior area;
a pressure sensing device mounted on said first housing in communication with said interior area and including an extension portion sealingly fixed to and extending through said first housing to communicate with said interior area and a body portion attached to said extension portion outside said first housing from said interior area, said pressure sensing device being configured to output a pressure signal from said body portion responsively to fluid pressure within said interior area;
a second housing sealingly enclosing at least part of said body portion of said pressure sensing device; and
a biasing mechanism in communication with said second housing and said first housing, said biasing mechanism being configured to bias said second housing away from said first housing toward said body portion of said pressure sensing device to form a sealing engagement between said second housing and said at least part of said body portion.

18. The assembly as in claim 17, wherein said body portion includes a ledge and wherein said biasing mechanism is configured to bias said second housing against said ledge.

19. The assembly as in claim 17, including a seal member disposed between said second housing and said body portion of said pressure sensing device.

20. The assembly as in claim 17, wherein said biasing mechanism includes at least one screw threadedly engaging said second housing so that rotation of said screw in either rotational direction causes movement of said screw with respect to said second housing, said screw extending beyond said second housing to abut said first housing so that rotation of said screw in one rotational direction moves said second housing toward said body portion of said pressure sensing device.

21. The assembly as in claim 17, wherein said second housing includes a floor section and wherein said biasing mechanism is configured to bias said floor section toward said body portion of said pressure sensing device.

22. A speed reducer assembly said assembly comprising:
an input shaft;
an output shaft;
a gear train interfacing said input shaft and said output shaft to effect a desired angular velocity ratio between said input shaft and said output shaft;
a first housing defining an interior area in which said gear train is disposed, said first housing being configured to hold lubricant within said interior area;
a pressure sensing device mounted on said first housing in communication with said interior area and including an extension portion extending through said first housing to communicate with said interior area and a body portion attached to said extension portion outside said first housing from said interior area, said pressure sensing device being configured to output a pressure signal from said body portion responsively to fluid pressure within said interior area;
a second housing sealingly enclosing at least part of said body portion of said pressure sensing device; and
a warning mechanism in operative communication with said body portion of said pressure sensing device, said warning mechanism configured to receive said pressure signal from said pressure sensing device and to output a corrective signal to initiate corrective action in response to the detected pressure in said interior area;
a pressure sensing device mounted on said first housing in communication with said interior area and including an extension portion extending through said first housing to communicate with said interior area and a body portion attached to said extension portion outside said first housing from said interior area, said pressure sensing device being configured to output a pressure signal responsively to fluid pressure within said interior area; and
a second housing sealingly enclosing at least part of said body portion of said pressure sensing device.

23. A speed reducer assembly, said assembly comprising:
an input shaft;
an output shaft;
a gear train interfacing said input shaft and said output shaft to effect a desired angular velocity ratio between said input shaft and said output shaft;
a first housing defining an interior area in which said gear train is disposed, said first housing being configured to hold lubricant within said interior area;
a pressure sensing device mounted on said first housing in communication with said interior area and including an extension portion extending through said first housing to communicate with said interior area and threadedly engaging said first housing to form a mechanical seal between said first housing and said extension portion, and a body portion attached to said extension portion outside said first housing from said interior area, said pressure sensing device being configured to output a pressure signal from said body portion responsively to fluid pressure within said interior area;

a second housing enclosing at least part of said body portion of said pressure sensing device, said second housing including a floor section defining a hole through which said extension portion of said pressure sensing device extends and a seal member disposed between said floor section and said body portion of said pressure sensing device;

at least one screw member threadedly engaging said second housing so that rotation of said screw member in either rotational direction causes movement of said screw with respect to said floor section, said screw extending beyond said floor section to abut said first housing so that rotation of said screw in one rotational direction moves said second housing toward said body portion of said pressure sensing device, and wherein a sealing engagement is formed between said floor section and said at least part of said body portion at said seal member when said screw member is rotated to press said seal member between said floor section and said body section; and a warning mechanism in operative communication with said pressure sensing device, said warning mechanism configured to receive said pressure signal from said pressure sensing device and to output a corrective signal to initiate corrective action in response to the detected pressure in said interior area.

* * * * *